US007539166B2

United States Patent
Do et al.

(10) Patent No.: US 7,539,166 B2
(45) Date of Patent: May 26, 2009

(54) CHANNEL ESTIMATOR, DEMODULATOR, SPEED ESTIMATOR AND METHOD THEREOF

(75) Inventors: Joo-Hyun Do, Seoul (KR); Hyung-Jin Choi, Seoul (KR); Sung-Jun Kim, Pohang-si (KR); Kil-Hyen Ryu, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 704 days.

(21) Appl. No.: 11/240,628

(22) Filed: Oct. 3, 2005

(65) Prior Publication Data

US 2006/0079184 A1 Apr. 13, 2006

(30) Foreign Application Priority Data

Oct. 7, 2004 (KR) .................. 10-2004-0080016

(51) Int. Cl.
H04B 7/216 (2006.01)
(52) U.S. Cl. .................. 370/335; 370/342; 370/328; 375/147; 375/148
(58) Field of Classification Search .................. 370/342, 370/335, 328; 375/147, 148
See application file for complete search history.

(56) References Cited

U.S. PATENT DOCUMENTS 6,668,172 B1 * 12/2003 Yoshimura .................. 455/441
6,765,952 B2 * 7/2004 Shiu .......................... 375/147
7,123,645 B2 * 10/2006 Ishizu et al. ................. 375/147
7,376,210 B2 * 5/2008 Kim et al. .................... 375/350
2002/0042279 A1 4/2002 Da Rocha et al. ........... 455/456
2002/0136278 A1 * 9/2002 Nakamura et al. .......... 375/148
2004/0076244 A1 4/2004 Juntti et al. ................. 375/340
2004/0184428 A1 * 9/2004 Im .............................. 370/342
2005/0083998 A1 * 4/2005 Li et al. ....................... 375/148

FOREIGN PATENT DOCUMENTS

KR   10-2004-0005339 A    1/2004
KR   2004-80366          9/2004

OTHER PUBLICATIONS

Korean Office Action dated Jul. 7, 2006 received in corresponding Korean Application No. 10-2004-0080016.
IEEE Article entitled "Adaptive Channel Estimation for OFDM Based High Speed Mobile Communication Systems".

* cited by examiner

*Primary Examiner*—Danh C Le
(74) *Attorney, Agent, or Firm*—Harness, Dickey & Pierce, P.L.C.

(57) ABSTRACT

A channel estimator, demodulator, speed estimator and method thereof. The speed estimator may generate a speed indicator indicating a speed of a mobile device. The channel estimator may perform channel estimation based on the estimated speed indicated by the speed indicator. The demodulator may perform channel compensation based on the channel estimation performed by the channel estimator.

18 Claims, 7 Drawing Sheets

CHANNEL ESTIMATOR, DEMODULATOR, SPEED ESTIMATOR AND METHOD THEREOF

PRIORITY STATEMENT

This application claims priority to Korean Patent Application No. 2004-80016 filed on Oct. 7, 2004 in the Korean Intellectual Property Office, the entire contents of which are hereby incorporated by reference.

BACKGROUND OF THE INVENTION

1. Field of the Invention

The present invention relates to a channel estimator, demodulator, speed estimator and method thereof, and more particularly to a channel estimator, demodulator, speed estimator and method thereof for determining a speed of a mobile device.

2. Description of the Related Art

A mobile communication system may employ a multiple access technology, such as Frequency Division Multiple Access (FDMA), Time Division Multiple Access (TDMA) and/or Code Division Multiple Access (CDMA).

A CDMA communication system may transfer data signals of each of its mobile stations within a single frequency bandwidth range using a Pseudo Noise (PN) code. The PN code may be used to distinguish between mobile stations. A receiver (e.g., a mobile station, a base station, etc.) may use a PN code matching a PN code of a corresponding transmitter in order to decode data sent from the corresponding transmitter. However, while the receiver and the transmitter may communicate if the same PN code is used by the receiver and the transmitter, the data sent from the transmitter to the receiver may not be decoded properly if the respective PN codes are not synchronized.

At the transmitter side, a data signal to be transmitted to the receiver may be spread. In an example, the spreading may include a data signal with n bits and may be multiplied by a spreading code with n bits to generate a spread signal. The spread signal may be transmitted to the receiver.

At the receiver side, the spread signal received from the transmitter may be de-spread. In an example, the spread signal may include n bits and may be multiplied by a de-spreading code with n bits to recapture the original data signal.

Conventional CDMA communication systems may employ a frequency bandwidth spreading technique. CDMA technology may typically be used in digital cellular system, a Personal Communication System (PCS), and/or an International Mobile Telecommunication-2000 (IMT-2000). Analog cellular systems may typically be referred to as first generation systems and digital systems (e.g., Global System for Mobile Communication (GSM), a Plasma Driven Catalyst (PDC), a IS-95, a IS-136, etc.) may typically be referred to as second generation systems.

The first and second generation systems may spread a wireless voice communication and may include services (e.g., a Short Message Service (SMS), access to data networks, etc.). Third generation systems may be designed for multi-media communication, may provide a higher quality picture and/or a higher quality video and may provide a higher data rate of communication. Accordingly, third generation systems may be widely used in public/private wireless communication networks.

An example of a third generation system may be a Wideband-CDMA (W-CDMA) system. The W-CDMA system may adopt a 32 kbps Adaptive Differential Pulse Code Modulation (ADPCM) and may be capable of maintaining a call connection for mobile stations moving at higher speeds. The W-CDMA system may employ a Direct Spread (DS) method that may be efficient at higher frequencies and may have lower interference/fading characteristics.

The term 'fading' may indicate that a strength of a received electric wave or signal may be changing (e.g., getting weaker) at a higher rate. The term 'fast fading' may indicate that a strength of an arriving signal may be changing at a higher rate based on an individual delay location. For example, fading may occur when the receiver moves at higher speeds. Fast fading may reduce an ability of the receiver to restore or decode data received from the transmitter without errors.

W-CDMA systems may include a rake receiver which may perform a synchronized sampling on a bandwidth spreading signal, correlation detection for a multiple path delay and weighting diversity for a channel reflection. The rake receiver may include a plurality of fingers and may demodulate higher energy path signals (e.g., the 3 or 4 path signals having the highest energy) among a plurality of received multi-path signals. Each of the fingers of the rake receiver may determine channel characteristics based on the higher energy path signals in order to perform channel compensation. Data in transmissions received at the receiver from the transmitter may be recovered by combining the higher energy path signals.

A channel estimator may determine receiving performance (e.g., of a Direct Spread/Code Division Multiple Access (DS/CDMA) system). Receiving performance may be affected by phase distortion, for example due to Rayleigh Fading or fast fading of a mobile wireless channel.

In DS/CDMA systems, a pilot channel with a plurality of pilot symbols may be transferred after being code-divided. The pilot channel may be used for a downward link so as to perform synchronization detection. A condition of a communication channel may be estimated by observing the pilot channel. Knowledge of the condition of the communication channel may reduce receiving errors due to fading (e.g., fast fading).

The channel estimator may be adapted for use in conventional CDMA modems and may be implemented using an Finite Impulse Response (FIR) filter, an Infinite Impulse Response (IIR) filter or a hybrid of the FIR filter and the IIR filter.

However, because of implementation complexity, the hybrid of the FIR filter and the IIR filter may be more difficult to use in the implementation of the channel estimator. As a result, the single FIR filter and the single IIR filter may typically be used for implementing the channel estimator.

The channel estimator employing the single FIR filter may have a processing delay occupying half of a channel observation duration required for channel estimation. A buffering process may thereby be required on a data channel performing channel compensation. Further, as the spreading factor increases, the problem of processing delay may likewise increase. Higher processing delays due to channel estimation may also delay speed power control in CDMA systems, thereby reducing performance of a feedback-loop power control.

Adjusting channel observation duration with regard to the speed of a mobile object may be difficult with conventional methodologies. As such, a fixed channel observation duration may be used, and a real system environment may operate at lower speeds. Thus, a fixed coefficient of the FIR filter may be based on the lower speeds.

In a system environment operating at higher speeds, estimating performance and receiving performance may be degraded because the filter coefficient may be configured for system environments operating at lower speeds.

CDMA systems may implement the channel estimator using the IIR filter. If the channel estimator is implemented using the IIR filter, an order of the IIR filter may be increased to obtain a sharp frequency response. There may be a trade-off between performance of the IIR filter and an ease of its implementation since implementation complexity may increase as the order of the IIR filter increases.

The channel estimator may be implemented using the IIR filter configured for operation with lower speed system environments. Therefore, in system environments operating at higher speeds and employing the IIR filter, an ability to estimate performance and receiving efficiency of a communication channel may be degraded. As mobilities of mobile stations continue to increase (e.g., due to faster forms of transportation), the problems associated with higher speed mobile stations in communication systems may likewise increase.

SUMMARY OF THE INVENTION

An example embodiment of the present invention may be directed to a channel estimating method, including obtaining a power spectrum of a received signal by performing a frequency transform on a pilot channel symbol, estimating a speed of a mobile device associated with the received signal based at least in part on the power spectrum and performing a channel estimation using the estimated speed of the mobile device.

Another example embodiment of the present invention is directed to a channel estimator, including a speed estimator performing a frequency transform on a pilot channel symbol to obtain a power spectrum of a received signal and estimating a speed of a mobile device based on the power spectrum and a plurality of channel estimation sections performing a channel estimation based on the estimated speed.

Another example embodiment of the present invention is directed to a demodulator, including a searcher configured to search for a received signal within a given frequency bandwidth range and configured to generate a plurality of path signals based on a transmission delay to transfer the generated plurality of the path signals to a plurality of fingers, a channel estimator configured to obtain a power spectrum of a pilot channel symbol corresponding to the plurality of the path signals, configured to estimate a speed of a mobile device using the obtained power spectrum, and configured to perform channel estimation using the estimated speed of the mobile device, a channel compensator configured to perform channel compensation on the plurality of the path signals using a result of the channel estimation performed by the channel estimator and a combiner configured to perform a maximum ratio combining process on the channel-compensated data channel symbols.

Another example embodiment of the present invention is directed to a speed estimator, including a plurality of power spectrum calculation sections configured to perform a frequency transform on a pilot channel symbol of each of a plurality of fingers to obtain a power spectrum of a received signal and a speed indicator generation section configured to generate a speed indicator representing information associated with a speed of a mobile device based on the obtained power spectrum.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE INVENTION

Detailed illustrative example embodiments of the present invention are disclosed herein. However, specific structural and functional details disclosed herein are merely representative for purposes of describing example embodiments of the present invention. Other example embodiments of the present invention may, however, be embodied in many alternate forms and should not be construed as limited to the example embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
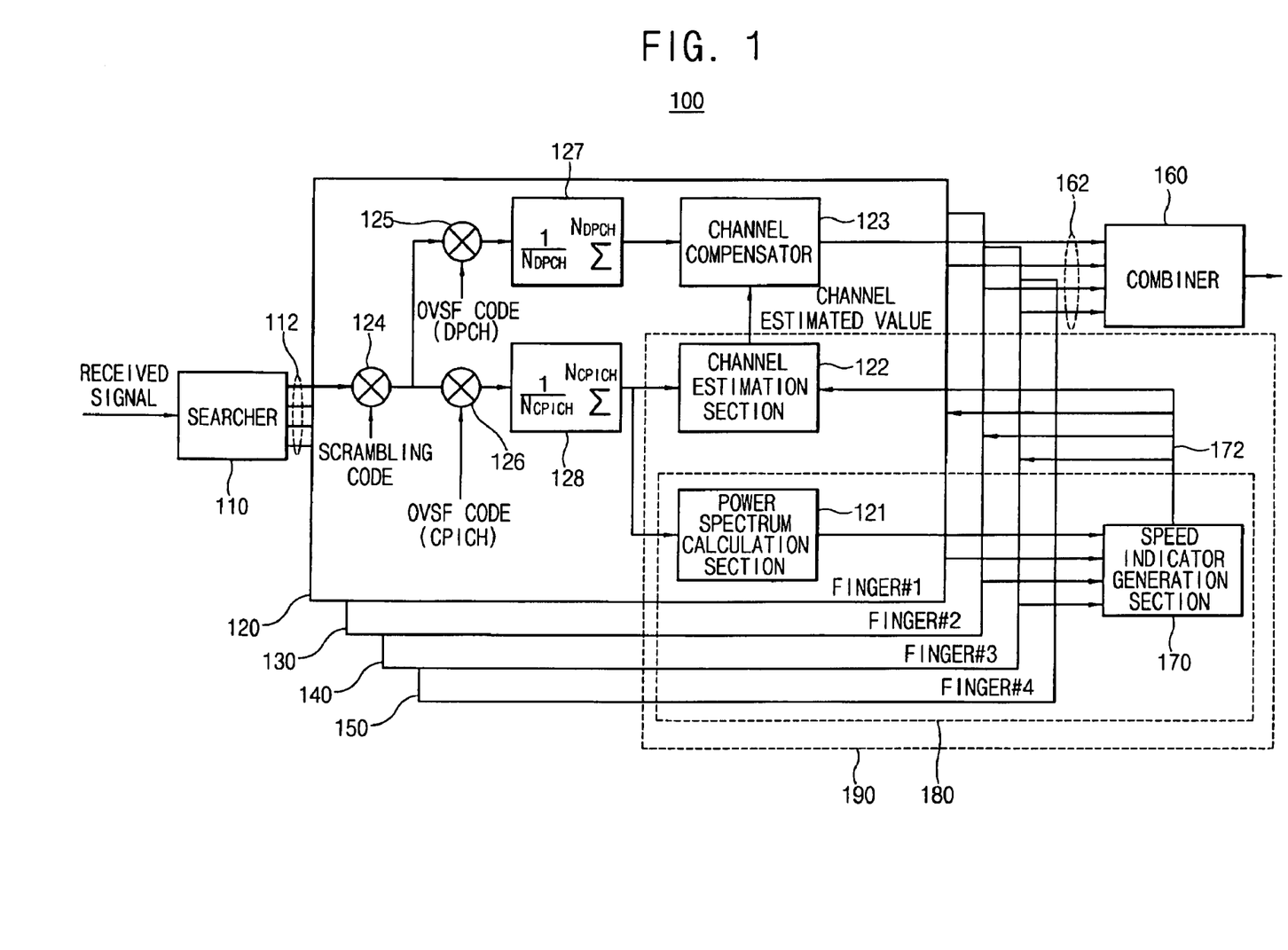
FIG. 1 is a block diagram illustrating a demodulator according to an example embodiment of the present invention.

FIG. 1 is a block diagram illustrating a demodulator 100 according to an example embodiment of the present invention.

In the example embodiment of FIG. 1, the demodulator 100 may include a searcher 110, fingers 120/130/140/150, a combiner 160 and a speed indicator generation section 170. In an example, the demodulator 100 may be implemented using a rake receiver and may be used in a Wideband Code Division Multiple Access (W-CDMA) system.

In the example embodiment of FIG. 1, the searcher 110 may monitor received signals within a given frequency bandwidth range. The searcher 110 may generate path signals 112 based on a transmission delay and may transmit the path signals 112 to the fingers 120, 130, 140 and 150, respectively. The searcher 110 may perform an initial synchronization acquisition process on a pilot channel.

In the example embodiment of FIG. 1, each of the four fingers 120, 130, 140 and 150 may receive one of the path signals 112 to perform a descrambling process, a de-spreading process and/or an accumulating process, and may generate a data channel symbol and a pilot channel symbol. In an example, the data channel symbol may include a Dedicated Physical Channel (DPCH) and the pilot channel symbol may include a Common Pilot Channel (CPICH).

In the example embodiment of FIG. 1, each of the fingers 120, 130, 140 and 150 may estimate a speed or mobility of a mobile object using the pilot channel symbol and may perform channel estimation based on the estimated speed of the mobile object. The estimated channel may be used to perform channel compensation.

In another example embodiment of the present invention, referring to FIG. 1, each of the fingers 120, 130, 140 and 150 may include the same structure and may perform the same operation in response to an input. Accordingly, this example embodiment will now be further described with respect to the operation of only the finger 120 for the sake of brevity. It is understood, however, that other example embodiments of the present invention may include fingers with different structures and/or functions. As such, the structures/functions described below are merely non-limiting examples of the finger 120.

In the example embodiment of FIG. 1, the finger 120 may include a power spectrum calculation section 121, a channel estimation section 122, and a channel compensator 123. The finger 120 may include mixers 124, 125 and 126, and integrators 127 and 128. The first mixer 124 may mix an input signal with a scrambling code to perform a descrambling process. The second mixer 125 may multiply the descrambled signal received from the mixer 124 by an Orthogonal Variable Spreading Factor (OVSF) to generate a data channel signal. The third mixer 126 may multiply the descrambled signal received from the first mixer 124 by the OVSF to generate a pilot channel signal.

In the example embodiment of FIG. 1, the first integrator 127 may integrate the data channel signals received from the second mixer 125 to determine an average of the integrated data channel signals and may generate a data channel symbol based on the determined average. The second integrator 128 may integrate the pilot channel signals received from the third mixer 126 to determine an average of the integrated pilot channel signals and may generate a pilot channel symbol.

In the example embodiment of FIG. 1, the power spectrum calculation section 121 may perform a frequency transform on the pilot channel symbol to generate a power spectrum. Hereinafter, the frequency transform may represent an operation in which a signal in a time domain may be transformed into a frequency domain. For example, a Fast Fourier Transform (FFT) may be used to perform the frequency transformation.

In the example embodiment of FIG. 1, the channel estimation section 122 may receive a speed indicator 172 to perform channel estimation based on a speed of the mobile object as indicated by the speed indicator 172. The channel compensator 123 may perform channel compensation for the data channel symbol using a result of the channel estimation generated by the channel estimation section 122 and may output a result of the channel compensation.

In an example, the other fingers 130, 140 and 150 may include the same elements as above-described with respect to the finger 120 and may likewise perform the same operations.

In the example embodiment of FIG. 1, the speed indicator generation section 170 may generate 4-speed indicators 172 for indicating a speed of the mobile object using 4-power spectrums calculated by each of the fingers 120, 130, 140 and 150. It is understood that the number of fingers is not limited to four, and likewise additional or fewer speed indicators 172 may be employed in other example embodiments of the present invention including other numbers of fingers.

In the example embodiment of FIG. 1, the combiner 160 may perform a Maximum Ratio Combining (MRC) process on 4-data symbols 162 that are channel-compensated in each of the fingers 120, 130, 140 and 150. Again, it is understood that the number of fingers is not limited to four, and likewise additional or fewer data symbols 162 may be employed in other example embodiments of the present invention including other numbers of fingers.

In the example embodiment of FIG. 1, the combiner 160 may be implemented with any well-known methods. For example, the combiner 160 may be implemented using a Digital Signal Processor (DSP).

In an example, the fingers 130, 140 and 150 may each include the power spectrum calculation section 121, the channel estimation section 122 and the channel compensator 123 as described above with respect to the finger 120. However, it is understood that other example embodiments of the present invention may employ fingers with different structures.

In the example embodiment of FIG. 1, a speed estimator 180 may include the power spectrum calculation section 121 in the finger 120 and the speed indicator generation section 170. The speed estimator 180 may calculate the power spectrum using the pilot channel symbol and may estimate the speed of the mobile object using the calculated power spectrum. The speed estimator 180 may perform interpolation which may thereby improve a resolution of the power spectrum.

In the example embodiment of FIG. 1, a channel estimator 190 may include the 4-power spectrum calculation sections 121 included in each of the fingers 120/130/140/140, the speed indicator generation section 170 and the 4-channel estimation sections 122. The channel estimator 190 may be implemented using any well-known methodology. For example, the channel estimator 190 may be implemented using a DSP. The channel estimator 190 may estimate the speed of the mobile object using the pilot channel symbol corresponding to each of the channel signals 112 and may perform channel estimation based on the estimated speed of the mobile object. The power spectrum may be calculated using the pilot channel symbol, and the speed of the mobile object may thereby be estimated using the calculated power spectrum.

Hereinafter, example embodiments of the speed estimator 180 and the channel estimation section 122, which may be collectively included within the channel estimator 190, will be described in greater detail.

In the example embodiment of FIG. 1, the estimation of the speed of the mobile object may be performed using a Doppler frequency and a carrier wave frequency determined from a received signal. A detection of the Doppler frequency may be performed using statistical characteristics of the received signal. For example, the Doppler frequency may be detected using a level crossing rate (LCR) of the fading, auto-covariance of an amplitude of the received signal. Further, the Doppler frequency may be detected using other well-known methods (e.g., an eigen space method, an envelope distribution technique of a logarithmic series, etc.). These well-known measurement methods may detect the Doppler frequency in a higher Signal-to-Noise-Ratio (SNR) environment. The power spectrum of the received signal may be used to detect the Doppler frequency.

In the example embodiment of FIG. 1, if the received signal is transmitted through a mobile wireless channel having a multi-path (e.g., the received signal is not transmitted through a mobile wireless channel having a direct path), a variation of the envelope having the Rayleigh distribution and rapid phase variation may be determined. The envelope/rapid phase variations may be related to a maximum Doppler frequency based on movements of the mobile communication terminal (e.g., base station) and a peripheral object.

In an example, the speed of the mobile object corresponding to the maximum Doppler frequency of the measured received signal may be obtained based on $$\tilde{v}_d = \frac{c \cdot f_m}{f_c}$$ Equation 1 where $v_d$ may denote an estimated speed of the mobile device, c may denote the speed of light (e.g., approximately 3*10^8 m/s), $f_c$ may denote a carrier wave frequency and $f_m$ may denote an estimated maximum Doppler frequency.

The maximum Doppler frequency of the received signal may be obtained by detecting a maximum or peak point of the power spectrum after performing the FFT operation on the received pilot symbol to calculate the power spectrum. The pilot symbol that may be received through a mobile wireless channel may be represented by $$r(t) = \sum_{p=1}^{L} a_p(t) \cdot e^{-j\phi_p(t)} \cdot u(t - \tau_p) + N(t)$$ Equation 2 where $\alpha_p(t)$ may denote an amplitude of a propagation path on each of the paths p, $\Phi_p(t)$ may denote a fading phase (e.g., a random phase generated by the Doppler effect), τ may denote a delay of the propagation path, N(t) may denote a complex Additive White Gaussian Noise (AWGN), L may denote a number of the paths, and u(t) may denote a transmitted symbol.

A Discrete Fourier Transform (DFT) may be performed on Equation 2, for example if there is no delay on the propagation path, to obtain $$X[k] = \sum_{n=0}^{N-1} x[n] e^{-j(2\pi/N)kn}, \quad n = 0, 1, L, N-1$$ Equation 3

A power spectrum of Equation 3 may be represented as $$PS_p[k] = \qquad \text{Equation 4}$$
$$\left[\sum_{n=0}^{N-1} a_p(n) \cdot \cos((2\pi/N)kn + \phi_p(n)) + N(n)\cos((2\pi/N)kn)\right]^2 +$$
$$\left[\sum_{n=0}^{N-1} a_p(n) \cdot \sin((2\pi/N)kn + \phi_p(n)) + N(n)\sin((2\pi/N)kn)\right]^2$$

where the maximum Doppler frequency may be obtained by detecting a peak point (e.g., a maximum level) of the power spectrum after calculating the power spectrum of the received pilot channel symbol. In Equation 4, the AWGN may be represented as $$E\left[\sum_{n=0}^{N-1} N(n)\cos((2\pi/N)kn)\right] = \qquad \text{Equation 5}$$
$$E\left[\sum_{n=0}^{N-1} N(n)\sin((2\pi/N)kn)\right] = \frac{1}{N} E[N(n)]$$

where E[.] may denote an ensemble average. A calculating process of the power spectrum on the pilot symbol of Equation 1 in accordance with Equations 2 through 5 will be readily apparent to one skilled in the art. In a further example, a FFT may be used to calculate the DFT (e.g., in digital systems).

Figure 2:
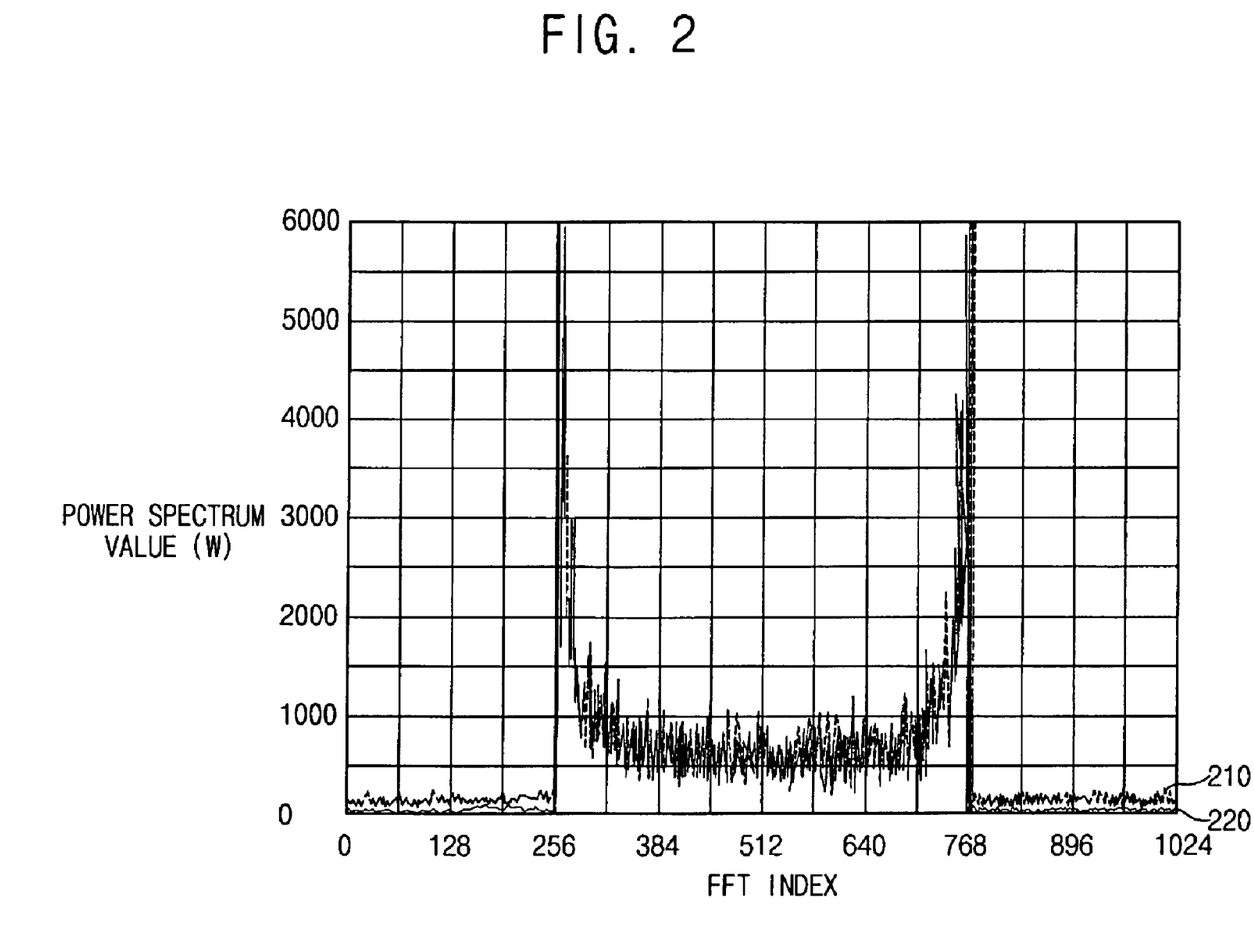
FIG. 2 is a graph illustrating a power spectrum value of a signal received at a mobile device moving at 200 km/h according to another example embodiment of the present invention.

FIG. 2 is a graph illustrating a power spectrum value of a signal received at a mobile device moving at 200 km/h according to another example embodiment of the present invention. While the mobile device corresponding to the graph of FIG. 2 is hereafter described as moving at a particular speed, it is understood that this speed is given as an example only and other example embodiments of the present invention may be directed to mobile devices moving at other speeds and/or stationary mobile devices. In the example embodiment of FIG. 2, a symbol rate of the received signal may be approximately 15 KHz and may include a 1024 FFT size. In the graph of FIG. 2, an x-axis may represent a FFT index and a y axis may represent the power spectrum values.

In the example embodiment of FIG. 2, the 1024 FFT index of the power spectrum may have a symbol energy/noise variance (Es/No) of approximately 0 dB 210 and approximately 3 dB 220, respectively. The power spectrum of FIG. 2 may record a maximum value at the maximum Doppler frequency point which may correspond to the speed of the mobile device.

In the example embodiment of FIG. 2, if the Es/No is reduced due to noise, the power spectrum across all frequency bandwidths may increase. However, this increase in the power spectrum may not substantially affect the maximum power spectrum value (e.g., because the maximum power spectrum value may be greater and thereby less sensitive to noise fluctuations). In an example, the speed estimation using the maximum power spectrum may be performed in lower SNR conditions.

In the example embodiment of FIG. 2, after locating the FFT index corresponding to the maximum power spectrum in order to determine the maximum Doppler frequency, the speed of the mobile device may be estimated. For example, the speed of the mobile device in the example embodiment of FIG. 2 may be approximately 200 km/h. As discussed above, it is understood that this speed is given as a non-limiting example only.

In another example, if a 32-FFT is used and a frequency of a 1 slot duration is approximately 1500 Hz, a resolution of the FFT index based on the 32-FFT may be approximately 46.875 Hz (e.g., 1500 divided by 32). Using the resolution of 46.875 Hz, the maximum Doppler frequency may be estimated from the FFT index corresponding to the maximum power spectrum. A power spectrum density of a wireless channel having the time varying Rayleigh distribution may be represented by $$PS_d(f) = \frac{1}{\pi f_m \sqrt{1 - \left(\frac{f}{f_m}\right)^2}} \qquad \text{Equation 6}$$

where $f_m$ may denote the maximum Doppler frequency.

Figure 3:
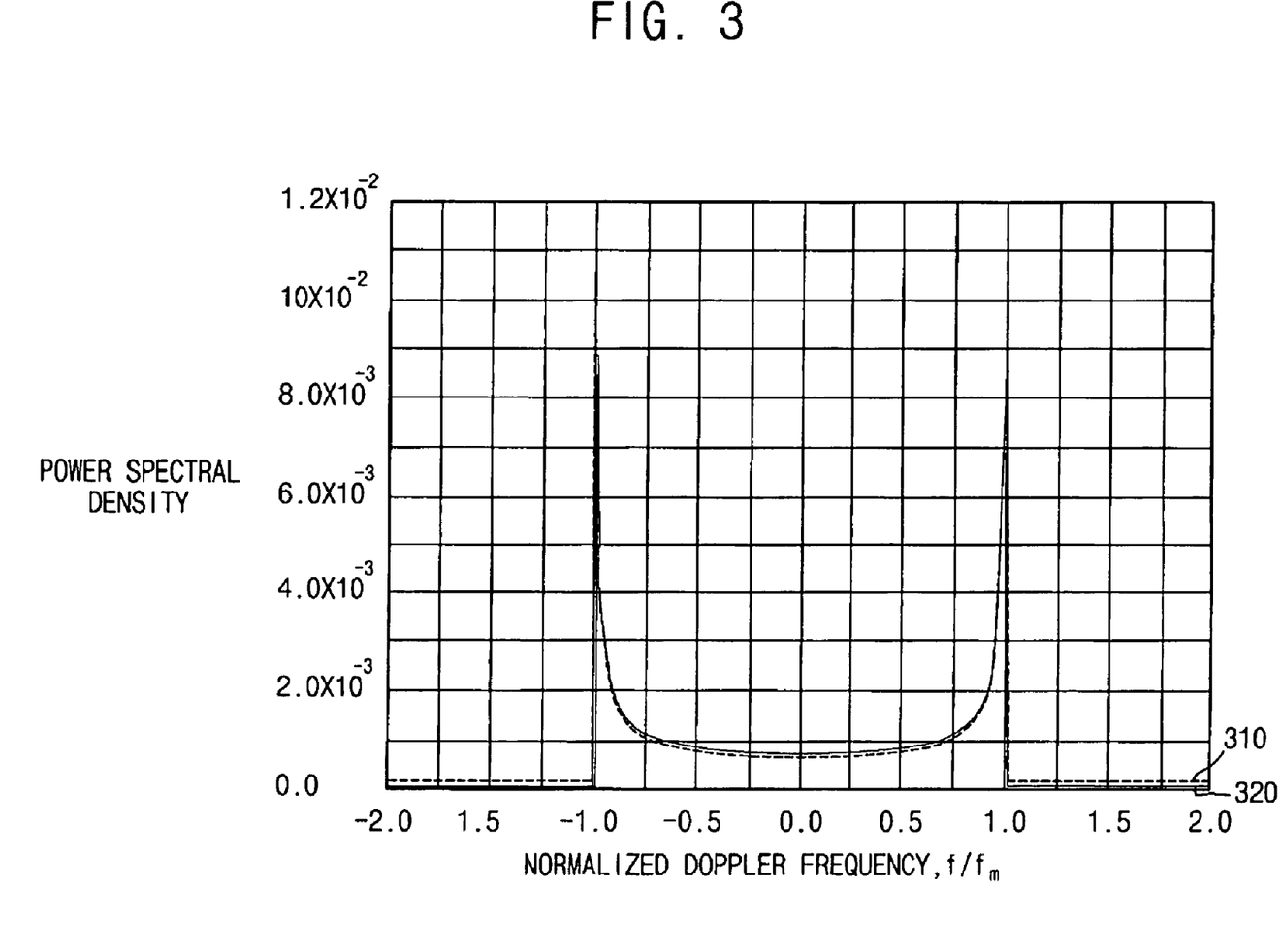
FIG. 3 is a graph illustrating a power spectrum density of a signal received at a mobile device moving at 200 km/h according to another example embodiment of the present invention.

FIG. 3 is a graph illustrating a power spectrum density of a signal received at a mobile device moving at 200 km/h according to another example embodiment of the present invention. While the mobile device corresponding to the graph of FIG. 3 is hereafter described as moving at a particular speed, it is understood that this speed is given as an example only and other example embodiments of the present invention may be directed to mobile devices moving at other speeds and/or stationary mobile devices. In the example embodiment of FIG. 2, a symbol rate of the received signal may be approximately 15 KHz. The x-axis may represent a normalized Doppler frequency $f/f_m$ and the y-axis may represent a Power Spectral Density (PSD). In the example embodiment of FIG. 3, power spectral density may have a symbol energy/noise variance (Es/No) of approximately 0 dB 210 and approximately 3 dB 220, respectively.

In the example embodiment of FIG. 3, a detected amount (e.g., degree, frequency, etc.) of the speed of the mobile device may be higher at the Doppler frequency point. Noise may cause increases to the detected amount (e.g., degree, frequency, etc) at positions of the power spectral density of FIG. 3 other than the Doppler frequency point. However, the degree of increase due to the noise may not set these other points to an amplitude higher than the Doppler frequency point. Accordingly, the simulated result represented in the graph of FIG. 3 may have a higher reliability for detecting a speed of a mobile device, for example, in lower SNR environments.

Figure 4:
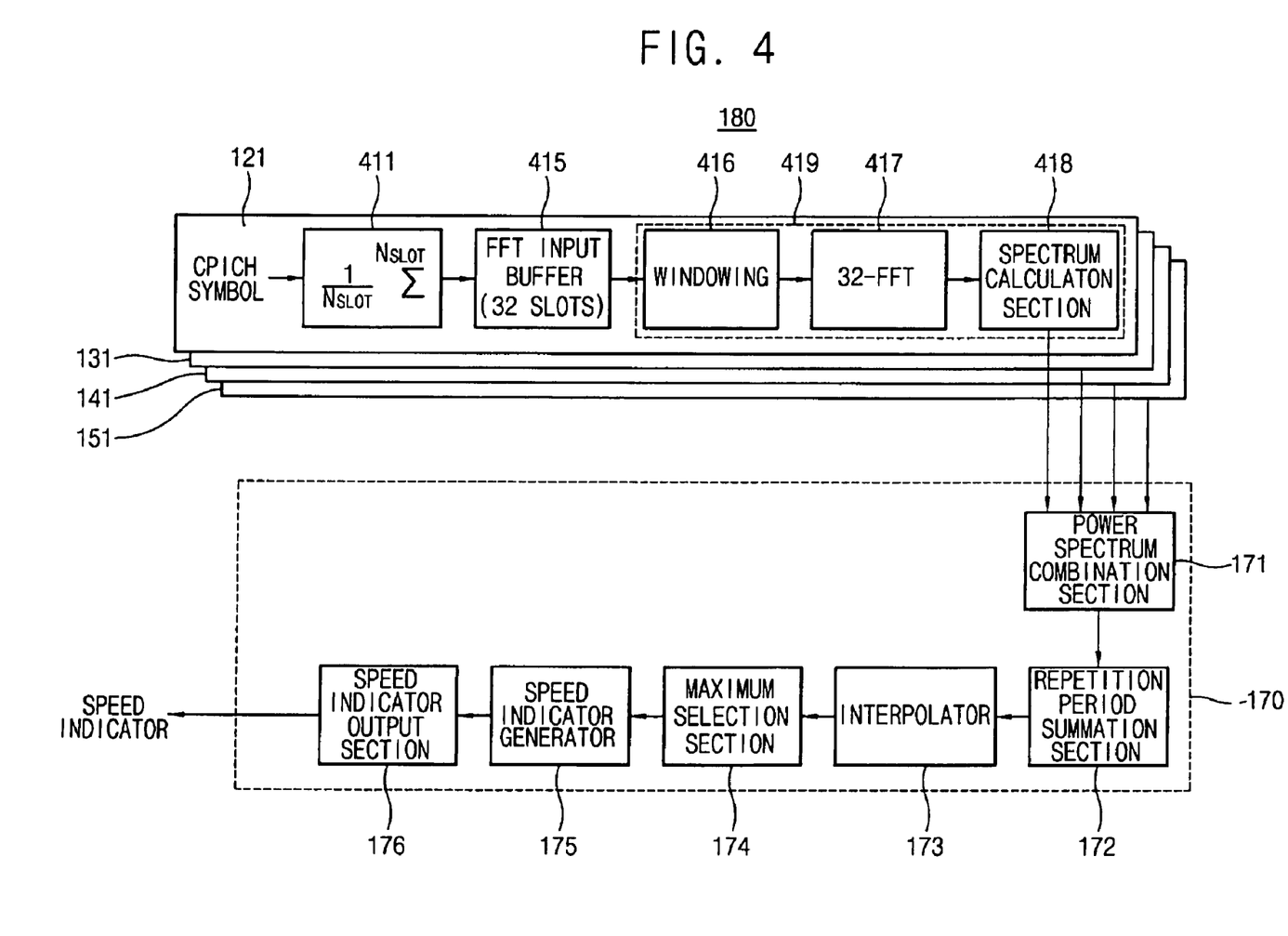
FIG. 4 is a block diagram illustrating a speed estimator according to another example embodiment of the present invention.

FIG. 4 is a block diagram illustrating the speed estimator 180 of FIG. 1 according to another example embodiment of the present invention.

In the example embodiment of FIG. 4, the speed estimator 180 may include the power spectrum calculation sections 121, 131, 141 and 151 and the speed indicator generation section 170. The power spectrum calculation section 121 and the speed indicator generation section 170 illustrated FIG. 4 may correspond to like-numbered elements illustrated in FIG. 1.

In the example embodiment of FIG. 4, the power spectrum calculation section 121 may include an integrator 411, a frequency transform input buffer 415 and a frequency transform section 419. The integrator 411 may determine an average of all pilot channel symbols within a single slot. The frequency transform input buffer 415 may store outputs of the integrator 411, which may correspond to a number of the slots. Thus, the frequency transform input buffer 415 may store an average of the pilot channel symbols corresponding to each of the slots outputted from the integrator 411. For example, the number of the slots may be 32.

In the example embodiment of FIG. 4, the frequency transform section 419 may receive an output of the frequency transform input buffer 415 to perform a frequency transform and may calculate a power spectrum using the frequency transformed information.

In another example embodiment of the present invention, the frequency transform may be 32-FFT. The speed estimator 180 will be hereafter described as operating in accordance with the 32-FFT frequency transform. Other example embodiments of the present invention, however, may include other frequency transform parameters.

In the example embodiment of FIG. 4, the frequency transform section 419 may include a windowing section 416, a Fast Fourier Transform (FFT) section 417 and a spectrum calculation section 418. The windowing section 416 may perform a windowing process which may prevent an effect due to an undesired higher frequency component. The FFT section 417 may perform the Fast Fourier Transform (e.g., the 32-FFT). The spectrum calculation section 418 may generate the power spectrum using a result of the Fast Fourier Transform in the FFT section 417. In an example, the power spectrum calculation sections 131, 141 and 151 may function similarly to the power spectrum calculation section 121.

In another example embodiment of the present invention, the above-mentioned power spectrum calculation sections and the elements included in the power spectrum calculation sections may be implemented using any well-known methodologies. For example, a Digital Signal Processor (DSP) may be used. In an alternative example, an Application Specific Integrated Circuits (ASIC) semiconductor may be used.

In the example embodiment of FIG. 4, the speed indicator generation section 170 may include a power spectrum combination section 171, a repetition period summation section 172, an interpolator 173, a maximum selection section 174, a speed indicator generator 175 and a speed indicator output section 176. The power spectrum combination section 171 may combine the power spectrums calculated by the power spectrum calculation sections 121, 131, 141 and 151. The repetition period summation section 172 may summate the outputs of the power spectrum combination section 171, which may correspond to the FFT output of multiple numbers which may thereby improve accuracy. The interpolator 173 may perform interpolation on the power spectrums summated by the repetition period summation section 172 which may improve a resolution of the FFT. For example, the interpolator 173 may include a second order parabolic interpolator.

In the example embodiment of FIG. 4, the maximum selection section 174 may select the FFT index corresponding to a peak point of the power spectrum interpolated by the interpolator 173. The speed indicator generator 175 may generate a speed indicator representing information related to a speed of the mobile device using the selected FFT index corresponding to the peak point. The speed indicator may indicate the speed of the mobile device, and may include various types of data.

In the example embodiment of FIG. 4, the speed indicator output section 176 may reduce an occurrence of a maximum power spectrum or peak point occurring at a frequency other than a maximum Doppler frequency when the mobile device is moving at higher speeds. In an example, the speed indicator output section 176 may output the speed indicator when identical speed indicators are consecutively generated a given number of times, thereby increasing a reliability of the speed measurement.

Figure 5:
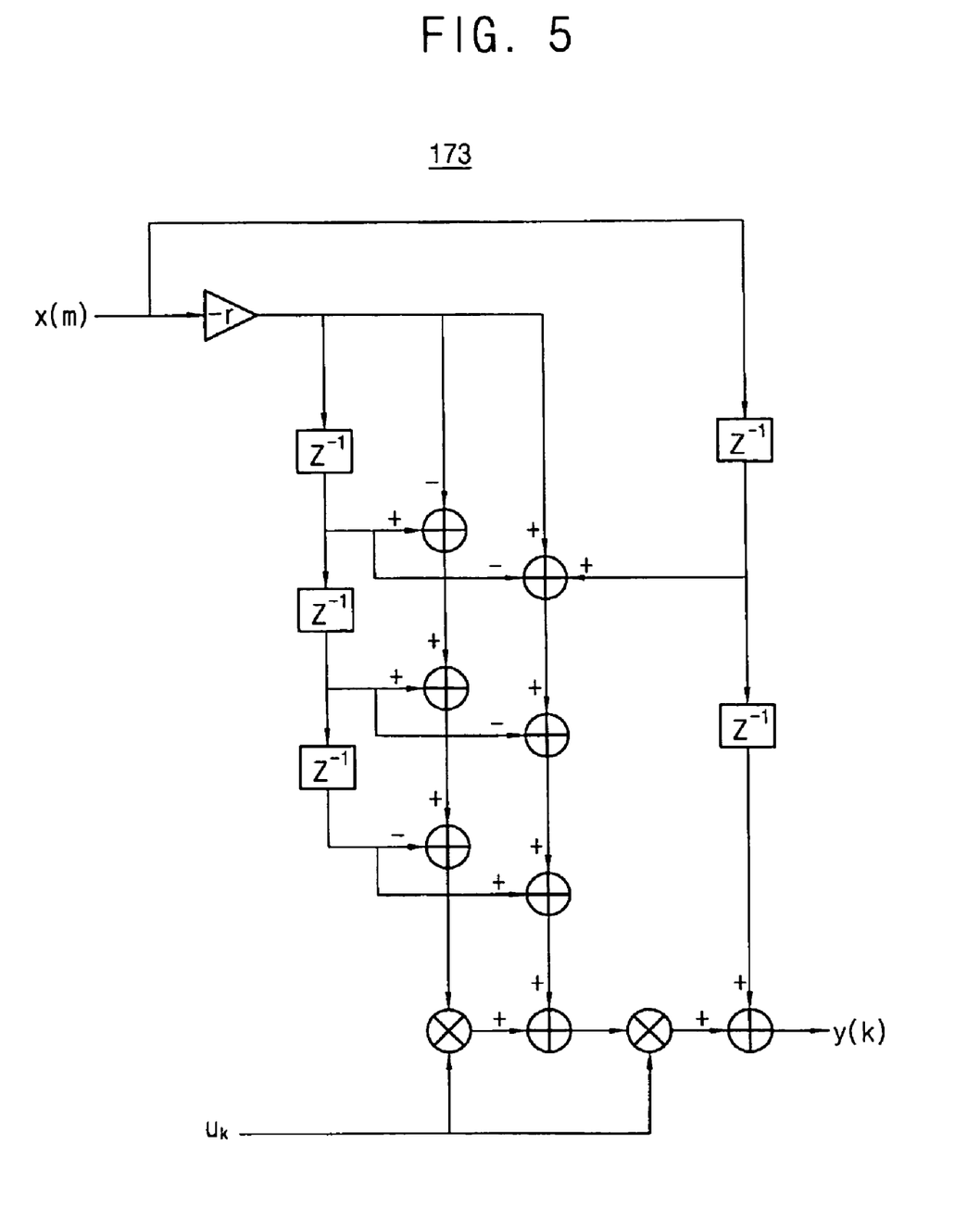
FIG. 5 is a block diagram illustrating an interpolator according to another example embodiment of the present invention.

FIG. 5 is a block diagram illustrating the interpolator 173 of FIG. 4 according to another example embodiment of the present invention.

In the example embodiment of FIG. 5, the interpolator 173 may include a second parabolic interpolator. An impulse response of the second parabolic interpolator may be represented by $$y(k) = r\,u_k(u_k - 1)x(k + 2) + (-r\,u_k + r + 1)x(k + 1) + \\ (r\,u_k + 1)(-u_k + 1)x(k) + r\,u_k(u_k - 1)x(k - 1)$$

Equation 7 where x(•) may denote FFT indexes, and $u_k$ and r may denote coefficients of the interpolator and y(k) may denote an interpolated value. In an example, the coefficient of the interpolator (e.g., one or more of $u_k$ and r) may be 0.5.

In the example embodiment of FIG. 5, the second parabolic interpolator may receive the FFT coefficients to generate values corresponding the FFT coefficients. The resolution of the speed estimator may thereby be improved.

Figure 6:
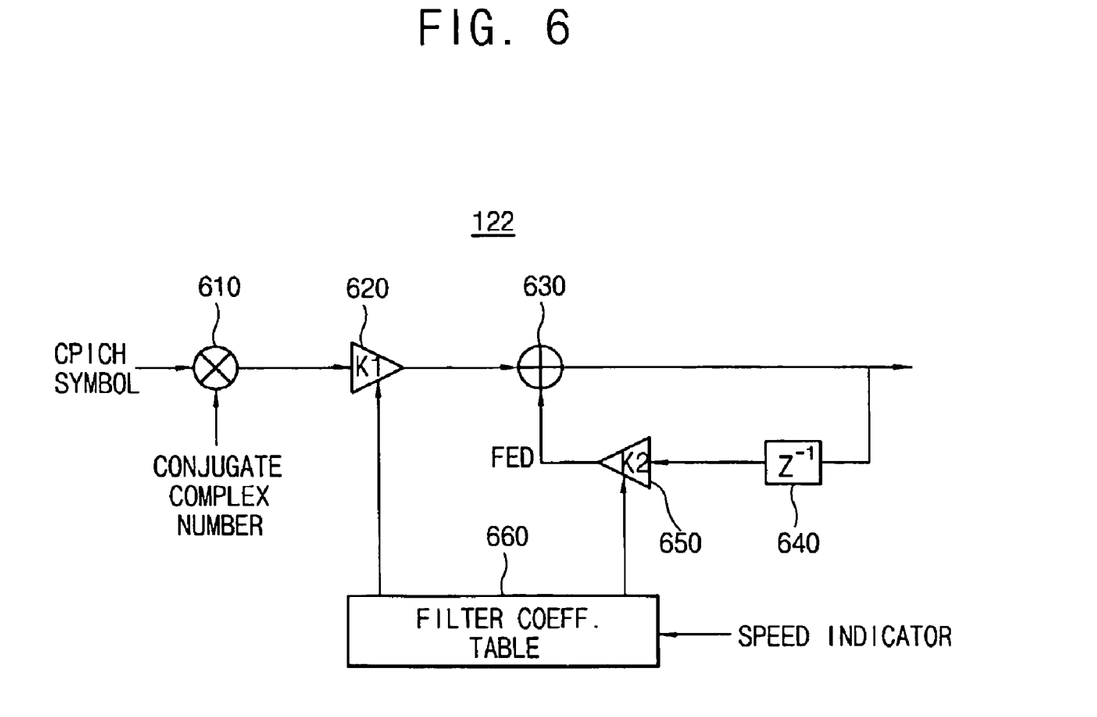
FIG. 6 is a block diagram illustrating a channel estimation section according to another example embodiment of the present invention.

FIG. 6 is a block diagram illustrating the channel estimation section 122 of FIG. 1 according to another example embodiment of the present invention. In an example, each of the fingers 120/130/140/150 of FIG. 1 may include the channel estimation section 122.

In the example embodiment of FIG. 6, the channel estimation section 122 may be implemented using an IIR filter. In a further example, the IIR filter illustrated in FIG. 6 may be a first order IIR filter.

In the example embodiment of FIG. 6, performance of the channel estimation section 122 may be improved by controlling the filter coefficient using the first order IIR filter.

In the example embodiment of FIG. 6, the IIR filter of FIG. 6 may include a mixer 610, a first amplifier 620, an adder 630, a delayer 640, a second amplifier 650 and a filter coefficient table 660. The mixer 610 may multiply a pilot channel symbol by a conjugate complex number (e.g., 0.5(1+j)*) to output a real number. The first amplifier 620 may amplify the real number by as much as a first gain K1. The adder 630 may add the output of the first amplifier 620 to a feedback signal FED. The delayer 640 may delay the output of the adder 630.

In the example embodiment of FIG. 6, the second amplifier 650 may amplify the output of the delayer 640 by as much as a second gain K2 to output the feedback signal FED. The filter coefficient table 660 may control the first gain K1 and the second gain K2 based on the speed indicator generated by the speed estimator 180. The filter coefficient table 660 may indicate relationships between the speed indicator, the first gain K1 and/or the second gain K2, and may be implemented using hardware and/or may be stored in a memory device. For example, the filter coefficient table 660 may be implemented as a read-only memory (ROM), a random access memory (RAM) (e.g., DRAM, etc.), etc.

In the example embodiment of FIG. 6, the first order IIR filter of FIG. 6 may control the first gain K1 and the second gain K2 based on the speed indicator to perform channel estimation based on the speed of the mobile device. The first gain K1 and the second gain K2 may be coefficients of the IIR filter.

In another example embodiment of the present invention, referring to FIG. 6, the relationships between the first gain K1 and the second gain K2 may be expressed by $$H(z) = \frac{K_1}{1 - K_2 z^{-1}} = \frac{K_1 z}{z - K_2} \quad \text{Equation 8}$$

$$H(e^{jwT}) = \frac{K_1 e^{jwT}}{e^{jwT} - K_2} \quad \text{Equation 9}$$

$$= \frac{K_1[\cos(wT) + j\sin(wT)]}{[\cos(wT) + j\sin(wT)] - K_2}$$

$$= \frac{K_t[\cos(wT) + j\sin(wT)]}{[\cos(wT) - K_2] + j\sin(wT)}$$

$$|H(e^{jwT})| = \sqrt{\frac{K_1^2(\cos^2(wT) + \sin^2(wT))}{[\cos(wT) - K_2]^2 + \sin^2(wT)}} \quad \text{Equation 10}$$

$$= \sqrt{\frac{K_1^2}{K_2^2 - 2K_2\cos(wT) + 1}}$$

$$= \sqrt{\frac{K_1^2}{[\cos^2(wT) + \sin^2(wT)] + K_2^2 - 2K_2\cos(wT)}}$$

$$K_2 = 1 - K_1 \quad \text{Equation 11}$$

where w may equal 2πf and T may denote a symbol duration. A value of the second gain K2 may be less than 1 since a pole may exist within a unit circle so as to stabilize the IIR channel estimation filter. As the frequency approaches 0, the gain of the IIR filter may approach 1.

Table 1 (below) may represent an example set of speed indicator values corresponding to the speed of the mobile device.

TABLE 1

| Speed Indicator | Speed range | speed_index |
|---|---|---|
| 0 | 0~25 | 0, 1 |
| 1 | 25~50 | 2~4 |
| 2 | 50~120 | 5~10 |
| 3 | 120~200 | 11~16 |
| 4 | 200~ | 17~31 |

In the example of table 1, the speed of the mobile device may be divided into 5 ranges, and each of the ranges may include an associated speed indicator. Generally, as the speed of the mobile device increases the speed range likewise increases. It is understood that other example embodiments may be directed to a table include a different number of ranges, different range values, different associated speed indicators, etc.

In the example embodiment of FIG. 4, referring to the example of Table 1, the maximum selection section 174 may determine a corresponding range among the 5 example ranges using an index corresponding to the selected maximum power spectrum. The maximum selection section 174 may determine the speed_index using the index corresponding to the selected maximum power spectrum and may further determines the speed indicator using the speed_index. The speed indicator may be determined using $$\text{speed\_index} = \left| n_{index} - \frac{N_{FFT}}{2} \right| \qquad \text{Equation 12}$$

where speed_index may denote a speed index, $n_{index}$ may denote an index corresponding to the maximum power spectrum and $N_{FFT}$ may denote a number corresponding to the FFT (e.g., $N_{FFT}$ may be 32 in the example where the 32-FFT may be employed).

In the example embodiment of FIG. 6, referring to the example of Table 1, after the speed indicator is generated using the index corresponding to the maximum power spectrum, a value of the first gain K1 and a value of the second gain K2 may be determined using the filter coefficient table 660. The filter coefficient table 660 may store the relationships between the speed indicator and the first gain K1 and the second gain K2 of the channel estimation section 122 (e.g., an IIR filter). Table 2 (below) illustrates an example set of the relationship between the speed indicator and the IIR filter coefficient.

TABLE 2

| Speed Indicator | IIR filter coefficient | |
|---|---|---|
| | $K_1$ | $K_2$ |
| 0 | 0.129 | 0.871 |
| 1 | 0.244 | 0.756 |
| 2 | 0.386 | 0.614 |
| 3 | 0.490 | 0.510 |
| 4 | 0.539 | 0.461 |

In an example, the relationships between the speed indicator and the IIR filter coefficients (e.g., as illustrated in Table 2) may be determined based on the performance of the channel estimator.

Figure 7:
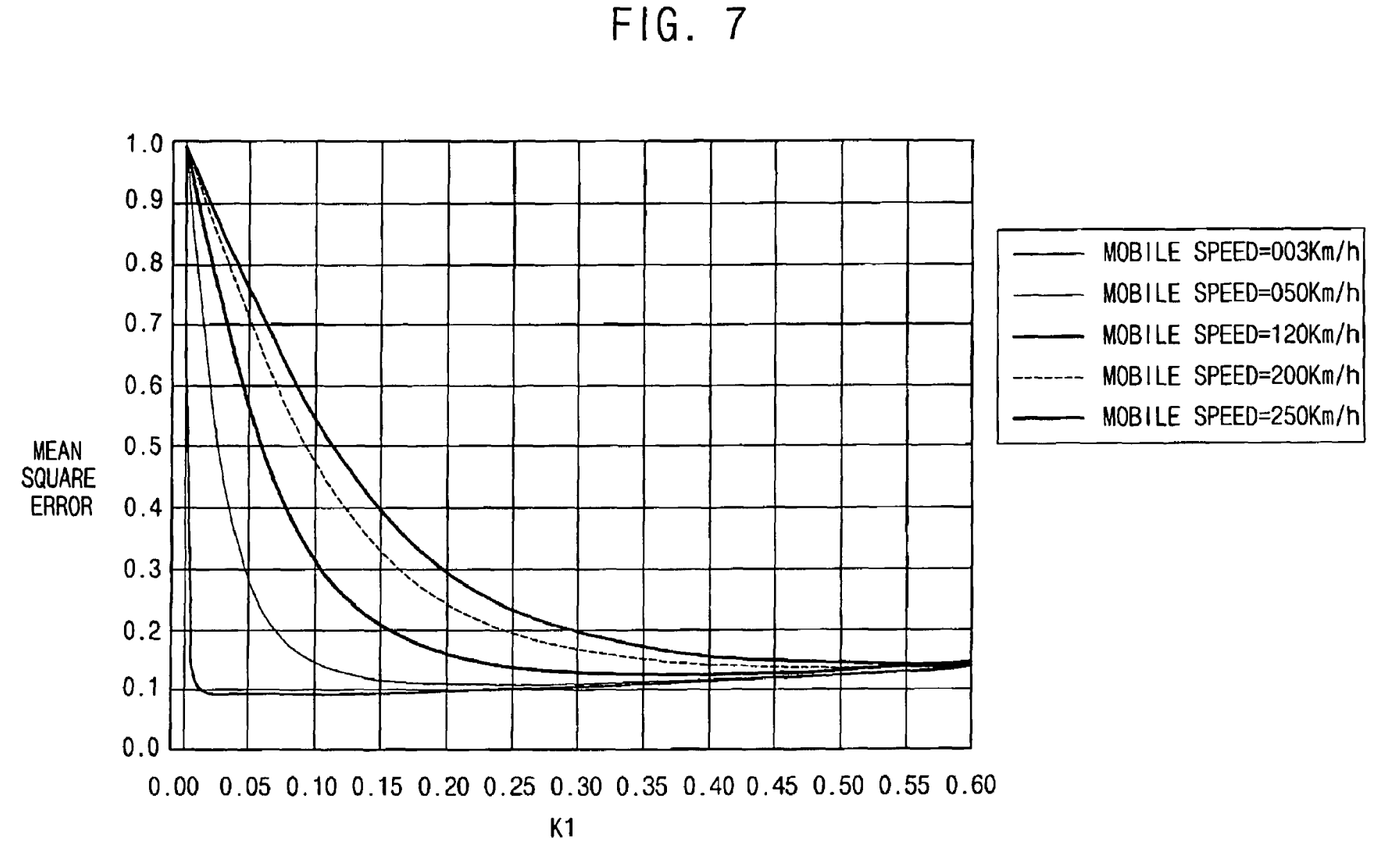
FIG. 7 is a graph illustrating filter coefficient curves at different mobile device speeds according to another example embodiment of the present invention.

FIG. 7 is a graph illustrating filter coefficient curves at different mobile device speeds according to another embodiment of the present invention. In the example embodiment of FIG. 7, each of the mean square error (MSE) corresponding to the variations of the filer coefficient based on each of the five mobile speeds may be illustrated. Based on the simulation result shown in FIG. 7, an IIR filter coefficient suitable for each of the illustrated speeds of the mobile devices may be selected (e.g., by a system designer). The speed of the mobile device may be represented by the speed indicator.

The channel compensation may be performed by storing the speed indicator and the IIR filter coefficients (e.g., the first gain K1 and the second gain K2) for the speed indicator matched with the table 2.

TABLE 3

| Data rate [kbps] | Propagation condition | | | | |
|---|---|---|---|---|---|
| | Static | Multipath | | | |
| | | Case 1 | Case 2 | Case 3 | Case 6 |
| 12.2 | 3.0 | 1.53 | 2.98 | 3.4 | 6.78 |

Table 3 (above) may represent a performance test result of the channel estimator according to another example embodiment of the present invention. Referring to Table 3, numbers corresponding to the 'Propagation Condition' may represent a performance margin. The values represented above in Table 3 may comply with the 3GPP TS 25.101 specification among the WCDMA specifications, and the tested data rate may approximate 12.2 kbps. The 3GPP TS 25.101 specification is well known in the art.

In the example of table 3, the channel estimator may indicate a general performance margin in static channel condition and in the conditions of multi-path, with Cases 1 and 2 having a mobile speed being approximately 3 km/h. The channel estimator may indicate a higher performance margin in the conditions of multi-path Case 3 having a mobile speed of approximately 120 km/h and the multi-path of Case 6 having a mobile speed of approximately 250 km/h.

In the example of table 3, each of the margins may be represented by decibel (dB) units and may represent a symbol energy/noise variance (Es/No) that may be added to a minimum requirement for receiving performance (e.g., as indicated in the TS25.101).

Example embodiments of the present invention being thus described, it will be obvious that the same may be varied in many ways. For example, the frequency transform performed by the speed estimator may not be limited to the 32-FFT, other example embodiments of the present invention may use other frequencies and/or frequency transform methods.

In addition, the interpolator included in the speed estimator may not be limited to the 2nd order parabolic interpolator, and other various interpolating techniques may be used.

As described above, the channel estimating method or the channel estimator of the mobile device according to example embodiments of the present invention may estimate the speed of the mobile device using a pilot channel symbol and may further perform channel estimation using the estimated speed of the mobile device.

The demodulating method and the demodulator of the mobile communication terminal according to example embodiments of the present invention may perform channel estimation and channel compensation based on the estimated speed of the mobile device.

The channel estimating method and/or the channel estimator of the mobile communication terminal according to example embodiments of the present invention may perform channel estimation based on a mobile speed, thereby reducing and/or preventing a deterioration of channel estimation efficiency or performance in a higher-speed wireless communication channel where the mobile device may move at higher-speeds.

Further, the demodulating method and the demodulator of the mobile communication terminal according to example embodiments of the present invention may improve performance of a receiver in a higher-speed conditions and may further reduce hardware complexity of the receiver by performing interpolation after the frequency transform and improve the resolution of the power spectrum which may thereby improve channel estimation.

Such variations are not to be regarded as departure from the spirit and scope of example embodiments of the present invention, and all such modifications as would be obvious to one skilled in the art are intended to be included within the scope of the following claims.

What is claimed is:

1. A demodulator, comprising:
   a searcher configured to search for a received signal within a given frequency bandwidth range and configured to generate a plurality of path signals based on a transmission delay to transfer the generated plurality of the path signals to a plurality of fingers;

a channel estimator configured to obtain a power spectrum of a pilot channel symbol corresponding to the plurality of the path signals, configured to estimate a speed of a mobile device using the obtained power spectrum, and configured to perform channel estimation using the estimated speed of the mobile device;

a channel compensator configured to perform channel compensation on the plurality of the path signals using a result of the channel estimation performed by the channel estimator; and a combiner configured to perform a maximum ratio combining process on the channel-compensated data channel symbols.

2. The demodulator of claim 1, wherein the channel estimator includes a speed estimator configured to perform a frequency transform on the pilot channel symbol to obtain the power spectrum and configured to estimate the speed of the mobile device using the obtained power spectrum and a channel estimation section configured to perform the channel estimation using the estimated speed of the mobile device.

3. The demodulator of claim 2, wherein the speed estimator performs interpolation to improve resolution of the power spectrum.

4. The demodulator of claim 3, wherein the interpolation includes a $2^{nd}$ order parabolic interpolation.

5. The method of claim 2, wherein the frequency transform includes a Fast Fourier Transform.

6. The demodulator of claim 5, wherein the Fast Fourier Transform is a 32-Fast Fourier Transform.

7. The demodulator of claim 2, wherein the speed estimator includes at least one power spectrum calculation section configured to perform a frequency transform on respective pilot channel symbols each corresponding to one of a plurality of fingers to obtain the power spectrum; and at least one speed indicator generation section configured to generate a speed indicator representing information on the speed of the mobile device using the obtained power spectrum.

8. The demodulator of claim 7, wherein the speed indicator generation section includes a power spectrum combination section configured to sum the outputs of the at least one power spectrum calculation section, a repetition period summation section configured to summate outputs of the at least one power spectrum combination section, an interpolator configured to perform an interpolation on the summated outputs of the power spectrum combination section, a maximum selection section configured to select an Fast Fourier Transform index corresponding to a peak point of the interpolated power spectrum, a speed indicator generator configured to generate the speed indicator representing information on the estimated speed of the mobile device using the selected Fast Fourier Transform index and a speed indicator output section configured to output the speed indicator if identical speed indicators are consecutively generated a given number of times.

9. The demodulator of claim 7, wherein the plurality of the path signals, the plurality of the fingers, the plurality of the data channel symbols and the plurality of the power spectrum calculation sections number 4, respectively.

10. The demodulator of claim 2, wherein the power spectrum calculation section includes an integrator configured to take an average of the respective pilot channel symbols within a slot, a frequency transform input buffer configured to store an output of the integrator, the output corresponding to a given number of slots and a frequency transform section configured to perform frequency transform on an output received from the frequency transform input buffer to obtain the power spectrum.

11. The demodulator of claim 10, wherein the given number of slots is 32.

12. The demodulator of claim 1, wherein the channel estimator sets a plurality of speed ranges, determines one of the plurality of speed ranges as associated with the estimated speed of the mobile device, and performs the channel estimation based at least in part on the associated one of the plurality of speed ranges.

13. The demodulator of claim 12, wherein a first of the plurality of speed ranges corresponding to a higher speed has a broader range as compared to a second of the plurality of speed ranges corresponding to a lower speed.

14. The demodulator of claim 12, wherein the channel estimator includes an Infinite Impulse Response filter, a coefficient of the Infinite Impulse Response filter varying based on which of the plurality of speed ranges is the associated one of the plurality of speed ranges.

15. The demodulator of claim 1, wherein the mobile device is used in a Wideband-Code Division Multiple Access system and the pilot channel symbol corresponds to a common pilot channel.

16. The demodulator of claim 1, further comprising a rake receiver.

17. The demodulator of claim 14, wherein the Infinite Impulse Response filter includes a mixer configured to multiply the pilot channel symbol by a conjugate complex number to output a real number, a first amplifier configured to amplify the real number by as much as a first gain, an adder configured to add an output of the first amplifier to a feedback signal, a delayer configured to delay an output of the adder, a second amplifier configured to amplify an output of the delayer by as much as a second gain to generate the feedback signal and a filter coefficient table configured to control the first gain and the second gain based on the speed indicator.

18. A method of performing channel estimation using the demodulator of claim 1.

* * * * *